United States Patent
Tarmey et al.

(10) Patent No.: US 10,492,066 B2
(45) Date of Patent: Nov. 26, 2019

(54) ACCESS AND AUTOMATION CONTROL SYSTEMS WITH MOBILE COMPUTING DEVICE

(71) Applicant: Sensormatic Electronics, LLC, Boca Raton, FL (US)

(72) Inventors: Stephen Tarmey, Leominster, MA (US); Brian Richard, Lunenburg, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 15/196,613

(22) Filed: Jun. 29, 2016

(65) Prior Publication Data

US 2017/0142581 A1 May 18, 2017

Related U.S. Application Data

(60) Provisional application No. 62/254,990, filed on Nov. 13, 2015.

(51) Int. Cl.
| | |
|---|---|
| *H04W 12/06* | (2009.01) |
| *H04W 4/80* | (2018.01) |
| *G07C 9/00* | (2006.01) |
| *H04W 4/14* | (2009.01) |
| *G06F 21/35* | (2013.01) |

(52) U.S. Cl.
CPC ............ *H04W 12/06* (2013.01); *G06F 21/35* (2013.01); *G07C 9/00* (2013.01); *G07C 9/0069* (2013.01); *G07C 9/00087* (2013.01); *G07C 9/00111* (2013.01); *G07C 9/00563* (2013.01); *G07C 9/00571* (2013.01); *G07C 9/00722* (2013.01); *H04W 4/14* (2013.01); *H04W 4/80* (2018.02); *G06F 2221/2137* (2013.01); *G07C 2009/00412* (2013.01); *G07C 2009/00793* (2013.01)

(58) Field of Classification Search
CPC ..................... G07C 9/00007; G07C 9/00174
USPC .......................................................... 340/5.6
See application file for complete search history.

(56) References Cited

U.S. PATENT DOCUMENTS

| | | | | |
|---|---|---|---|---|
| 2002/0180579 | A1* | 12/2002 | Nagaoka ............. | H04L 12/2803 340/3.1 |
| 2006/0059365 | A1* | 3/2006 | Harper ................. | G06F 19/323 713/186 |
| 2007/0050303 | A1* | 3/2007 | Schroeder ............... | G06F 21/32 705/67 |
| 2007/0186106 | A1* | 8/2007 | Ting .................... | H04L 63/0815 713/168 |

(Continued)

OTHER PUBLICATIONS

International Search Report and Written Opinion of the International Searching Authority, dated Mar. 1, 2017, from International Application No. PCT/US2016/061374, filed Nov. 10, 2017. Ten pages.

(Continued)

*Primary Examiner* — Vernal U Brown
(74) *Attorney, Agent, or Firm* — HoustonHogle LLP

(57) ABSTRACT

A system and method for providing multi-factor authentication that requires a user provide credentials via an authenticating server when attempting access or to control local functions and then, based on the success with the authenticating server, provides the access or control of local functions at subsequent attempts at access or control of the local functions.

24 Claims, 3 Drawing Sheets

(56) References Cited

U.S. PATENT DOCUMENTS

| | | | |
|---|---|---|---|
| 2011/0311052 A1 | 12/2011 | Myers et al. | |
| 2012/0240214 A1* | 9/2012 | Ogura | G06F 21/31 |
| | | | 726/12 |
| 2012/0268243 A1* | 10/2012 | Kappeler | G07C 9/00031 |
| | | | 340/5.61 |
| 2013/0214898 A1 | 8/2013 | Pineau et al. | |
| 2014/0294259 A1* | 10/2014 | Lee | G06K 9/00013 |
| | | | 382/124 |

OTHER PUBLICATIONS

International Preliminary Report on Patentability, dated May 24, 2018, from International Application No. PCT/US2016/061374, filed November 10, 2017. Seven pages.

\* cited by examiner

ACCESS AND AUTOMATION CONTROL SYSTEMS WITH MOBILE COMPUTING DEVICE

RELATED APPLICATIONS

This application claims the benefit under 35 USC 119(e) of U.S. Provisional Application No. 62/254,990, filed on Nov. 13, 2015, which is incorporated herein by reference in its entirety.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as access system controllers, access control readers, video surveillance cameras, network video recorders (NVRs), and door controllers, to list a few examples.

The access control readers are often installed at access points of the buildings to control access to restricted areas, such as buildings or areas of the buildings. Examples of access points include front and interior doors of the buildings, elevators, hallways connecting two areas of a building, to list a few examples. The access control readers authenticate identities of (or authorize) individuals and then permit those authenticated individuals to access the restricted areas through the access points.

Typically, individuals interact with the access control readers by swiping keycards or bringing contactless smart cards within range (approximately 2-3 inches or 5 centimeters) of the reader. The access control readers read the information of the keycards and then the access control systems determine if the individuals are authorized to access the restricted areas. If the individuals are authorized to enter the restricted areas, then the access control readers or system controller allow access to the restricted areas by unlocking locked doors, signaling that doors should be unlocked, opening elevator doors, or activating elevators.

Multifactor authentication can be a more robust approach to authenticating individuals. Simply swiping a keycard does not address the problem of stolen keycards. In contrast, multifactor authentication requires more than one mechanism of authentication from independent categories of credentials to verify the individual's identity.

SUMMARY OF THE INVENTION

Employing multifactor authentication at access points in access control systems generally increases the costs and complexity of the systems. There is additional wiring and hardware costs to add multi-factor authentication at a door or room or elevator, for example. In addition, the secondary authentication mechanism also generally lacks flexibility since a physical device must be commissioned at the door. For example, if the secondary mechanism is a fingerprint scanner, then there is no way of providing multifactor authentication for an individual without an authenticated fingerprint in the authentication database.

The present invention leverages the recognition that existing multifactor authentication solutions will typically rely on the addition of a keypad to the access card reader and/or biometric authentication mechanism such as a fingerprint/ iris scanner. The function associated with these devices, however, is currently available on commodity mobile computing devices such as smartphone and tablet devices and can be leveraged for a lower cost and/or flexible solution.

In general, according to one aspect, the invention features a method for multi-factor authentication. This method comprises requiring a user to provide credentials via a mobile computing device to an authenticating server when attempting access or to control local functions and based on the success with the authenticating server, providing the access or control of local functions at subsequent attempts at access or control of local functions.

In embodiments, the method further includes initiating a first attempt to access or control local functions by swiping a card of the user. In other examples, the first attempt to access or control local functions is initiated by scanning a code, using BLE, or selecting a door from a list.

A message is preferably sent to the mobile computing device that provides a link to the authenticating server. This message can be sent to the mobile computing device via SMS or other messaging system. Then, preferably, the mobile computing device accesses the authenticating server and sends encrypted information that identifies the user.

The credentials provided by the mobile computing device can include a fingerprint scan, a pin, a matching pattern, answers to security questions, and/or a picture of their face. For a predetermined time after success with the authenticating server, the user is only required to swipe their card at doors of the premises.

In examples, the local functions include: entrance of a schedule to keep the door unlocked during class time, reservation of a room, access location on a floor plan/map, access to a list of others entering a room, and/or control of lights for a room.

In general according to one aspect, the invention features a system for multi-factor authentication. This system comprises a mobile computing device that enables a user to provide credentials when attempting access or to control local functions, an authenticating server that receives the credentials, and an access control system that provides the access or control of local functions at subsequent attempts at access or control of local functions in response to the authenticating server verifying the credentials.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms including the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
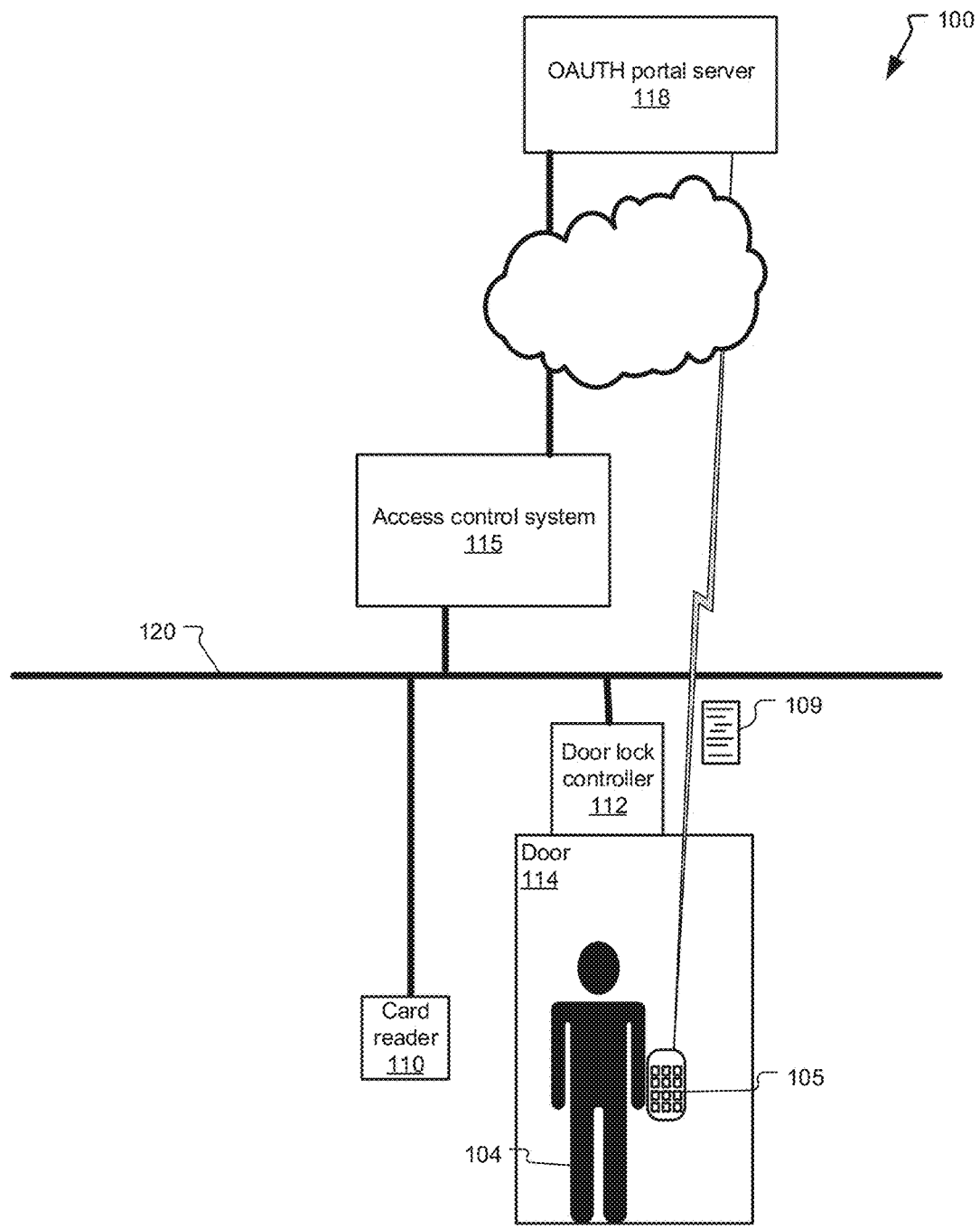
FIG. 1 is a block diagram of an embodiment of the inventive security system with a multi-factor authentication access control system according to the present invention.

FIG. 1 is a block diagram of an embodiment of a security system with a multi-factor authentication access control system 100 that has been constructed according to the principles of the present invention.

In more detail, the multi-factor authentication access control system 100 leverages mobile computing devices 105, such as smart phones, tablets, and other portable device, such as devices running the Android or IOS operating systems, which is typically available to users 104. The system 100 includes a bridge between an on-premise access control system controller 115 to a typically remote authenticating authority server, such as an OAUTH portal server 118.

Such OAUTH servers allow for external systems to authenticate users with well-known accounts without requiring the systems to maintain the username/passwords themselves. There are many established OAUTH providers available including Google, Facebook, and Amazon and others.

In general, OAUTH is an open standard for authorization. OAuth provides client applications with a 'secure delegated access' to server, or here physical, resources on behalf of a resource owner (owner of the access control system 100). OAUTH provides a process for resource owners to authorize this third-party access to their resources without sharing credentials. OAUTH typically works with Hypertext Transfer Protocol (HTTP).

Here, OAuth portal server 118, upon successful authentication, issues access tokens to the mobile computing devices 105 for approved users on the access control system 100. The mobile computing device 105 then uses the access token to obtain access at the access control reader 110 through the door or other portal 114.

The system 100 enables the users 104 to authenticate with their mobile device 105 and then be allowed access at the access control card reader 110.

This architecture can be used to eliminate the need for additional hardware at the door 114 while still providing the necessary multi-factor authentication prior to access being granted through the door or portal 114.

In general, the mobile device 105 requires connectivity to the internet or at least limited connectivity to the authenticating authority server 118 of the authenticating authority. The on-premise access control system 115 provides for management and configuration of the access control rules being applied to the door 114. The authenticating authority server 118 connects to both the mobile devices 105 of the users and the on premise access control system controller 115. The door lock controller 112 maintains the lock/unlock status of the door 114. Finally, the authenticating authority server 118 preferably employs the OATH standard for authentication.

When a door is configured for two factor authentication any cards even with valid access are denied entry on first swipe.

Figure 2:
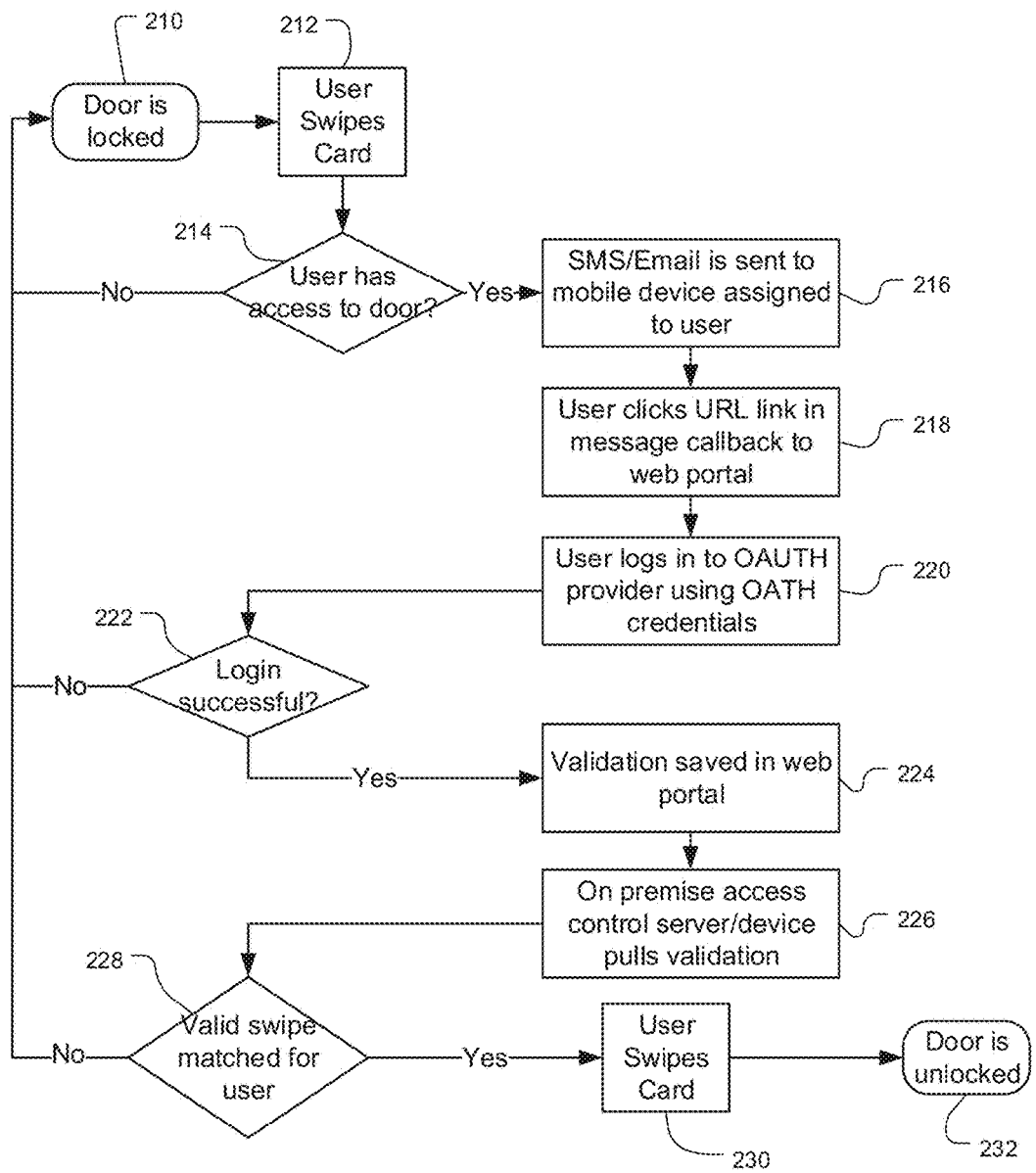
FIG. 2 is a flow diagram illustrating the workflow for the multi-factor authentication access control system showing what occurs after a user swipes to the point where the door unlocks, or if any validation fails, how the door will not unlock.

In more detail, as illustrated in FIG. 2, the process begins with the door, for example, being locked at step 210. Approaching the door, the user 104 swipes or presents their card in step 212 in the card reader 110 associated with the door 114, through which they desire access.

The present workflow is triggered on card swipe in which the users 104 presents their keycard to be read at the access control card reader 110, typically adjacent to the door 114. However in other examples, the authentication process is initiated with the user's device 104 uniquely identifying the door 114. In one example, the authentication process is initiated by using a camera of the device 105 to scan a QR Code, Barcode, or other image, which identifies the door 114. In other examples, the door is identified by the device detecting a Bluetooth Low Energy (BLE) or similar broadcast. In one example, iBeacon broadcast is used. The broadcast or beacon is transmitted from the lock controller 112 or the reader 110 or otherwise broadcast in connection with the door 112. In still another example, the user selects the door 114 from a pre-populated list presented by the mobile device app executing on the device 105.

In step 214, the system 100 determines whether or not the user 104 indicated by the keycard is authorized to have access through the door 114. This determination can be made locally at the card reader 110 if valid user profiles are cached on the card reader 110. In other examples, the card reader 110 may pass the card information to the access control system controller 115, which returns information concerning whether or not the user 104 is authorized to access through the door 114.

If it is determined in step 214 that the user is not authorized to access to the door, then the door remains locked.

On the other hand, if it is determined that the user 104 is authorized to have access through the door 114, then upon this first attempt, a message is transmitted electronically to the mobile computing device 105 in step 216. In one example, the access control system 115 stores the phone numbers and/or email addresses of authorized users. In different examples, this message is sent by different modalities. For example, the message may be sent using the telephone number for the mobile device 105 using SMS messaging protocols or other similar messaging systems (iMessage or WhatsApp). In other examples, the messages are sent via email, TCP-IP, webservice, to list a few more examples. In any event, the mobile device 105 pertaining to the user 104 who swiped their keycard has been preconfigured such that it can receive information from the access control system 115.

In one example, the information is transmitted in a message 109 that has been crafted with a URL or other link that enables the device 105 (from SMS, Email, or App) to call back to the web portal authenticating authority server 118 in step 218. This URL will contain encrypted information in the parameters that identify the user 104. In examples, the encrypted information includes: Email address, customer number, employee number, unique door identifier for door 114, and/or the time of the swipe.

When the user 104 clicks the link in the original message 109, the information is transmitted to the web portal authenticating authority server 118 in step 218. In some examples, the user is presented with a list of OAUTH providers for authentication. The user is redirected to the OAUTH provider of their choice. Then, the user 104 provides the credentials used for authentication to the authenticating authority server 118 in step 220.

Different levels of authorization/credentials through the device 105 can be supported natively based on the type of device being used. In one example, the device 105 includes a fingerprint scanner that scans the fingerprint of the user 104. In other example, the App executing on the device prompts the user 104 to enter a user name and personal identification number (PIN). In one specific example, the process forces the user to unlock the device 105 via a PIN in order for authorization on the device 105. In another example, an application program (App) executing on the device prompts the user 104 to enter a personalized swipe pattern on the device's touchscreen. Still other examples include security questions; random, pre-agreed upon security questions for the user to answer on the device 105; and/or facial recognition. Here, the front facing camera of the device 105 captures an image of the face of the user 104 and facial recognition is performed to confirm that the user 104 is the authorized user of the device 105.

Without one, many, or all of the above challenges being passed the device is not allowed to engage in the described workflow.

The authorizing information or the credentials are then analyzed at the authenticating authority server 118, in step 222. If this login is unsuccessful, then the door remains locked in step 210. However, if the login is successful in step 222, then the validation is saved on the authenticating authority server in step 224. In step 226, the local access control system controller 115 pulls the validation from the authenticating authority server 118, and the door lock controller 112, for example, is signaled to unlock the door 114.

Further, upon the next poll from the on premise access control system the validation is analyzed. If there was a valid swipe from this user and the swipe was validated and the swipe occurred within a configurable window of time, such as within the last 24 hours or last week, from the original swipe, the response at the door is modified by the controller 115 so that it will now accept the next swipe from this user.

At subsequent card swipes at the door 114 or any of the other doors at the premises and/or controlled by the controller 115, if the valid card swipe is matched to the user 104 in step 228, and their card swipe is received in step 230, the door is unlocked in step 232, without the need for an additional factor authentication.

In summary, during the first card swipe, the user is passed to the server 118 for credential authorization. Then, for a predetermined time after successful authentication, such as for the remainder of the day, the user need only swipe their card at the door or other doors within the premises and they will be granted access.

The above workflow is described specifically for the feature of multi-factor authentication for door access; however, this same workflow could be used for many additional door or room specific functions. These include:

Classroom: User is prompted to enter a schedule to keep the door unlocked during class time, during the next hour, during the next half hour, etc.

Room Reservation: User can reserve/book a conference room in a calendar at the door.

Location: After user swipes their card, the location is shown on a floor plan/map.

Occupancy: After user swipes, show who has used the door in the last hour, who is currently in the room behind the door, etc.

Issue Commands: turn on/off lights for room, arm/disarm Intrusion Zone, etc.

Figure 3:
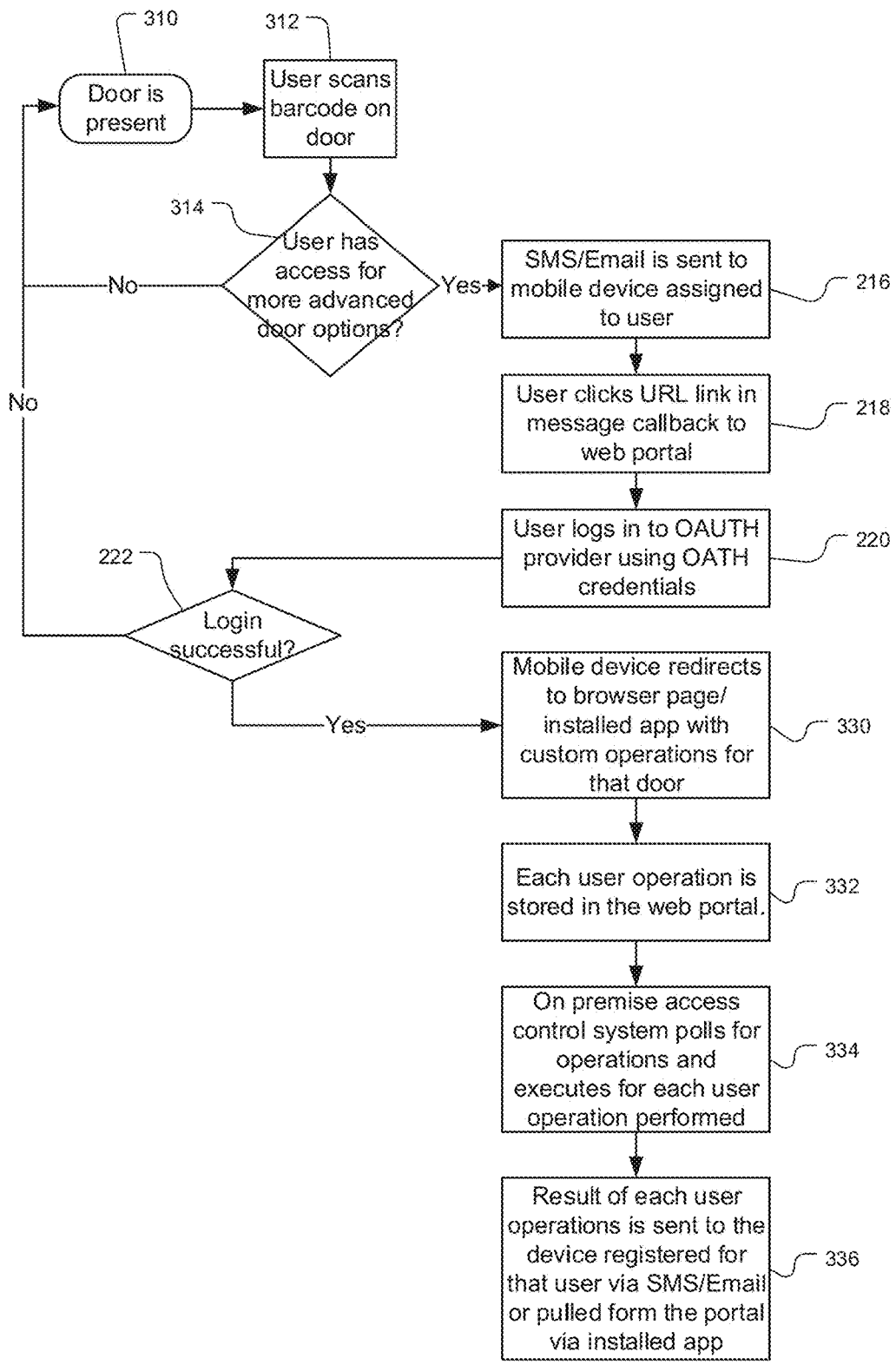
FIG. 3 is a flow diagram illustrating a secondary authentication workflow to perform additional door functions on a door or room, for example, within an on-premise access control system.

In more detail, as illustrated in FIG. 3, one workflow for the system for allowing additional control is shown.

In one example, the user approaches the door or the room in step 310. In order to identify the door or the room, an image, QR code, or barcode, for example, is scanned in one example in step 312.

Based on this scan, the access control system controller 115 determines whether or not the user 104 has access to advanced door options or room options in step 314.

If this is determined in the affirmative, then the authentication process previously described with respect to steps 216, 218, and 220 is performed using the authenticating authority server 118.

If the login is successful as determined in step 222, then the mobile device 105 is redirected to a browser page or installed app executing on the mobile device 105 in step 330 that facilitates control of local functions for the room, for example.

In one example, each user operation is stored in the web portal 332, and an on-premises access control system 115 pulls for available local functions and executes each of the user selected functions in step 334. Finally, in step 336, the results of each user operation are sent to the device 105 registered for that user 104 via messaging such as SMS or email or pulled from the portal via the installed app.

While this invention has been particularly shown and described with references to preferred embodiments thereof, it will be understood by those skilled in the art that various changes in form and details may be made therein without departing from the scope of the invention.

What is claimed is:

1. A method for multi-factor authentication, comprising:
    requiring a user to provide credentials via a smart phone mobile computing device to an authenticating server when attempting access or to control local functions; and
    based on the success with the authenticating server, providing the access or control of local functions at subsequent attempts at access or control of local functions, wherein for a predetermined time after success with the authenticating server only requiring the user to swipe their card at doors of the premises and not requiring the provision of the credentials via the smart phone mobile computing device.

2. A method as claimed in claim 1, further comprising initiating a first attempt to access or control local functions by swiping a card of the user.

3. A method as claimed in claim 1, further comprising initiating a first attempt to access or control local functions by scanning a code, using BLE, or selecting a door from a list.

4. A method as claimed in claim 1, further comprising transmitting a message to the smart phone mobile computing device that provides a link to the authenticating server.

5. A method as claimed in claim 4, wherein the message to the smart phone mobile computing device is sent via SMS or other messaging system.

6. A method as claimed in claim 4, wherein the selection of the link enables the user to provide credentials used for authentication on the authenticating server.

7. A method as claimed in claim 1, further comprising the smart phone mobile computing device accessing the authenticating server and sending encrypted information that identifies the user.

8. A method as claimed in claim 1, further comprising enabling the user to select among different authentication providers.

9. A method as claimed in claim 1, wherein the credentials provided by the smart phone mobile computing device include a fingerprint that is scanned by the smart phone mobile computing device, a PIN that is entered on the smart phone mobile computing device, a matching pattern that is entered on a touch screen of the smart phone mobile computing device, answers to security questions that are entered on the smart phone mobile computing device, and a picture of their face that is captured by a camera of the smart phone mobile computing devices.

10. A method as claimed in claim 1, wherein the local functions include: entrance of a schedule to keep the door unlocked during class time, reservation of a room, access location on a floor plan/map, access a list of others entering a room, and control of lights for a room.

11. A method as claimed in claim 1, wherein providing access includes unlocking a door via a door lock controller.

12. A system for multi-factor authentication, comprising:
a smart phone mobile computing device that enables a user to provide credentials when attempting access or to control local functions;
an authenticating server that receives the credentials; and
an access control system that provides the access or control of local functions at subsequent attempts at access or control of local functions in response to the authenticating server verifying the credentials, wherein for a predetermined time after success with smart phone mobile computing device providing credentials to the authenticating server the user need only swipe their card at doors of the premises for access or control of local functions.

13. A system as claimed in claim 12, further comprising a card reader, the user initiating a first attempt to access or control local functions by swiping a card.

14. A system as claimed in claim 12, wherein the user first attempts to access or control local functions by scanning a code, using BLE, or selecting a door from a list.

15. A system as claimed in claim 12, wherein the access control system sends a message to the smart phone mobile computing device that provides a link to the authenticating server.

16. A system as claimed in claim 15, wherein the message to the smart phone mobile computing device is sent via SMS or other messaging system.

17. A system as claimed in claim 15, wherein selection of the link on the mobile computing device enables the user to provide credentials on the mobile computing device used for authentication on the authenticating server.

18. A method as claimed in claim 12, wherein the smart phone mobile computing device accesses the authenticating server and sends encrypted information that identifies the user.

19. A system as claimed in claim 12, wherein the smart phone mobile computing device includes a fingerprint scanner touchscreen or a camera, and wherein the credentials provided by the smart phone mobile computing device include a fingerprint scan from the fingerprint scanner, a pin entered via the touchscreen, and a picture of their face from the camera.

20. A system as claimed in claim 12, wherein the local functions include: entrance of a schedule to keep the door unlocked during class time, reservation of a room, access location on a floor plan/map, access a list of others entering a room, and/or control of lights for a room.

21. A system as claimed in claim 12, wherein the access control system signals a door lock controller to unlock a door in response to verifying the credentials.

22. A method for multi-factor authentication, comprising:
requiring a user to provide fingerprint credentials via a smart phone mobile computing device to an authenticating server when attempting access or to control local functions; and
requiring the users to swipe a keycard;
based on a response from the authenticating server and the keycard swipe providing access or to control local functions; and
for a predetermined time after success obtaining access or to control local functions with smart phone mobile computing device, only requiring the user to swipe the keycard for access or control of local functions.

23. A system for multi-factor authentication, comprising:
a smart phone mobile computing device that enables a user to provide fingerprint credentials when attempting access or to control local functions;
access control reader for enabling a keycard to be swiped;
an authenticating server that receives the fingerprint credentials; and
an access control system that provides the access or control of local functions based on the swipe of the keycard and a message from the authenticating server based on validity of the fingerprint credentials, and for a predetermined time after success obtaining access or to control local functions with smart phone mobile computing device, the access control system only requiring the user to swipe the keycard for access or control of local functions.

24. A method for authentication for an authentication system for a premises, the method comprising:
a user presenting a card to a card reader associated with a door of the premises;
the system determining whether or not the user indicated by the keycard is authorized to have access through the door locally at the card reader by reference to user profiles cached on the card reader;
if the system determines that the user is authorized to have access through the door, then upon a first attempt, sending an SMS message a mobile computing device of the user, the message containing a link to a web portal of an authenticating authority server;

the user providing further credentials used for authentication to the authenticating authority server by scanning a fingerprint of the user with the mobile computing device;

analyzing the further credentials at the authenticating authority server and signaling a door lock controller to unlock the door; and within a subsequent window of time, only requiring the user to present the card at card readers of the premises without needing an additional factor authentication.

* * * * *